B. F. JOHNSTON.
ALARM DEVICE FOR MOTOR VEHICLES.
APPLICATION FILED DEC. 28, 1916.

1,239,602.

Patented Sept. 11, 1917.
3 SHEETS—SHEET 1.

Benjamin F. Johnston
INVENTOR.

BY
ATTORNEYS.

B. F. JOHNSTON.
ALARM DEVICE FOR MOTOR VEHICLES.
APPLICATION FILED DEC. 28, 1916.
1,239,602.
Patented Sept. 11, 1917.
3 SHEETS—SHEET 2.
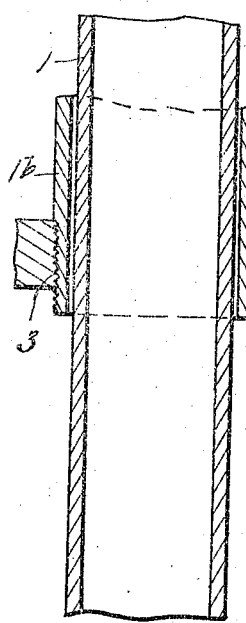
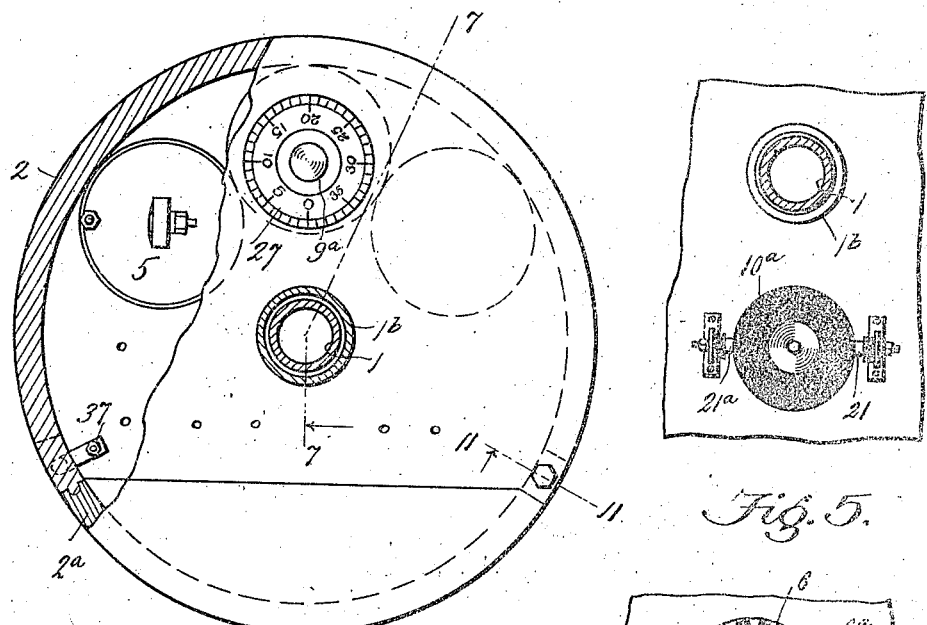
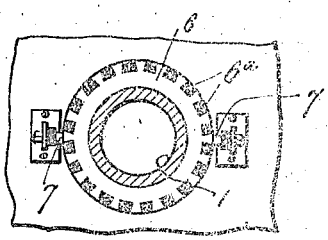
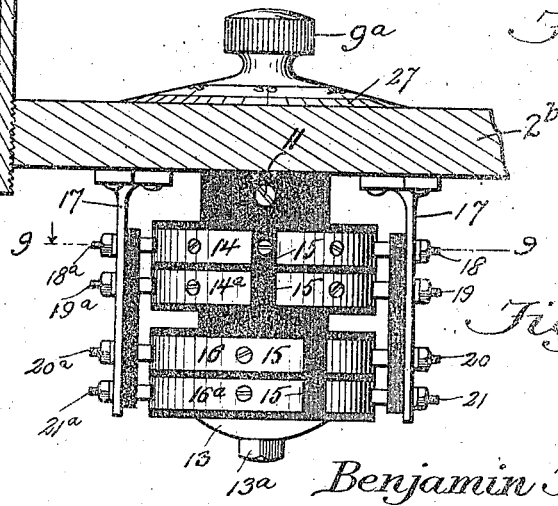
Benjamin F. Johnston
INVENTOR.
ATTORNEYS.

B. F. JOHNSTON.
ALARM DEVICE FOR MOTOR VEHICLES.
APPLICATION FILED DEC. 28, 1916.

1,239,602.

Patented Sept. 11, 1917.
3 SHEETS—SHEET 3.

Benjamin F. Johnston
INVENTOR.

BY Milo R. Stevens & Co.
ATTORNEYS.

ized dish# UNITED STATES PATENT OFFICE.

BENJAMIN F. JOHNSTON, OF OGDEN, UTAH, ASSIGNOR OF ONE-HALF TO WINFRED R. MOWBRAY, OF OGDEN, UTAH.

ALARM DEVICE FOR MOTOR-VEHICLES.

1,239,602.  Specification of Letters Patent.  Patented Sept. 11, 1917.

Application filed December 28, 1916. Serial No. 139,335.

*To all whom it may concern:*

Be it known that I, BENJAMIN F. JOHNSTON, a citizen of the United States, residing at Ogden, in the county of Weber and State of Utah, have invented new and useful Improvements in Alarm Devices for Motor-Vehicles, of which the following is a specification.

This invention relates to alarm devices for motor vehicles designed to prevent unauthorized use or theft of the car, and its object is to provide a device of this kind which is efficient and reliable in operation, and simple in construction.

The invention also has for its object to provide an alarm which is sounded when the steering shaft of the car is operated, the mechanism being so constructed and arranged that the slightest turn of the steering shaft to guide the car causes the alarm to be sounded. Thus the car cannot be turned or kept in a straight course without the alarm being sounded.

The invention also has for its object to provide a protecting housing for the mechanism which is so constructed that the alarm will also be sounded if an attempt is made to break open the housing.

With the herein stated objects in view, the invention consists in a novel combination and arrangement of parts to be hereinafter described and claimed, and in order that the same may be better understood, reference is had to the accompanying drawings forming a part of this specification.

Figure 1:
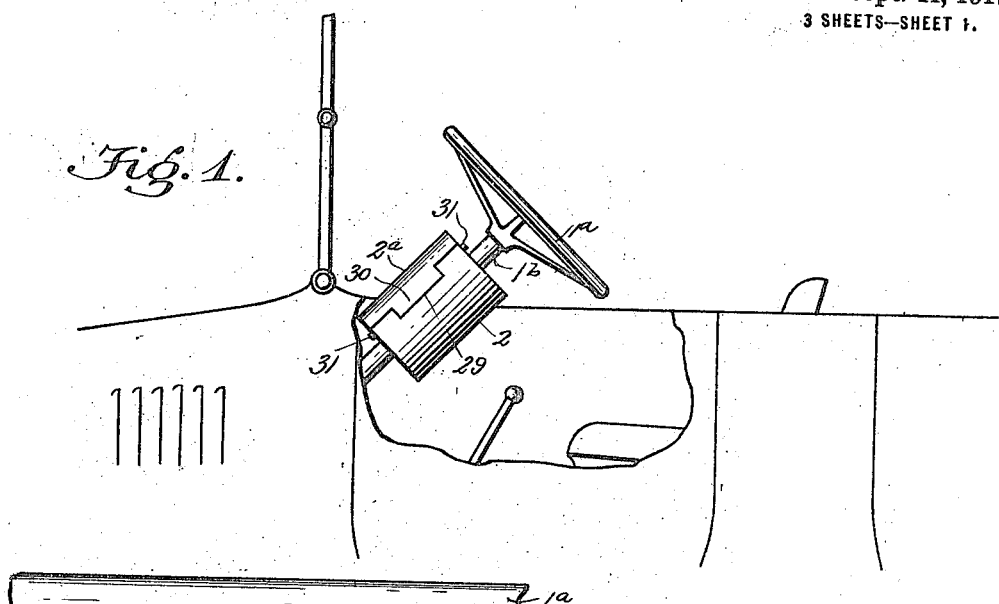
Figures 2, 3:
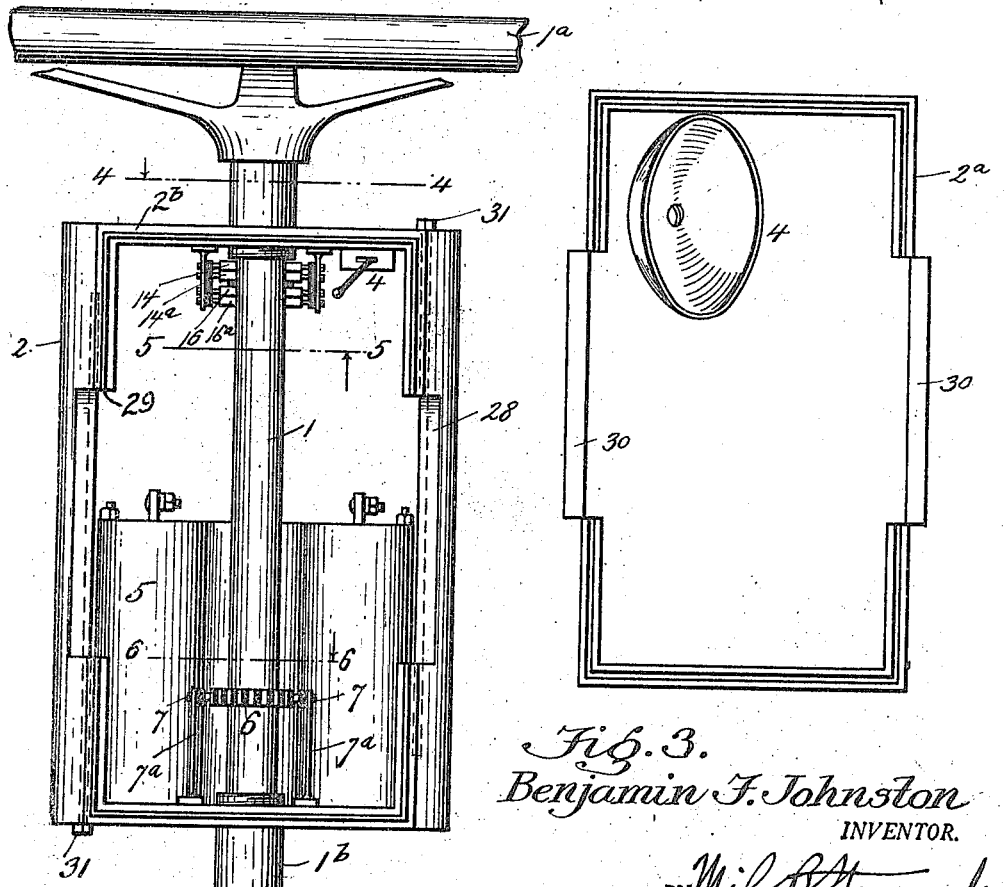
Figures 8, 9:
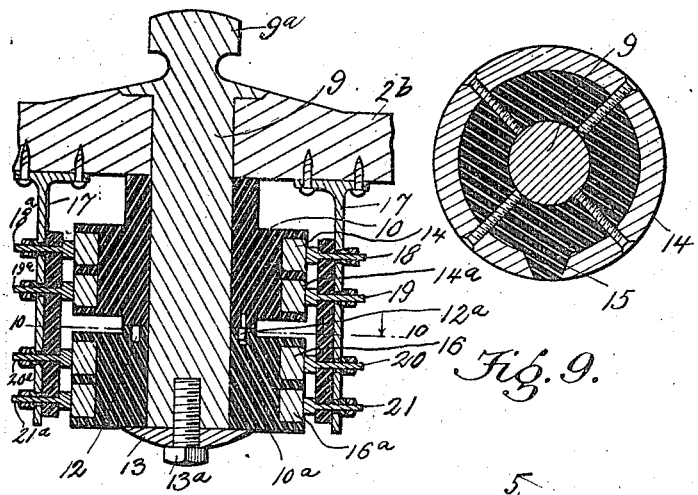
Figure 10:
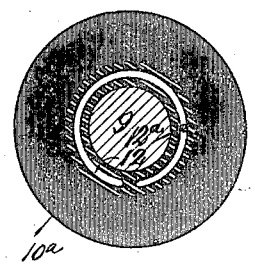
Figure 11:
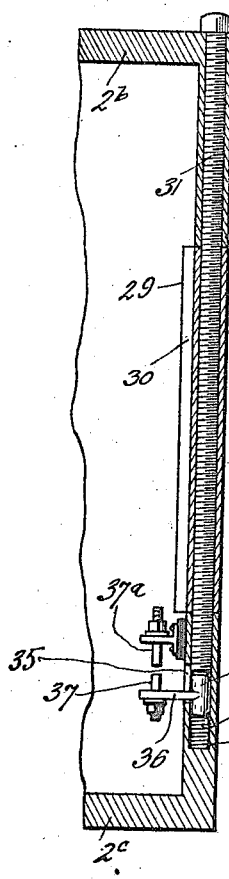
Figure 12:
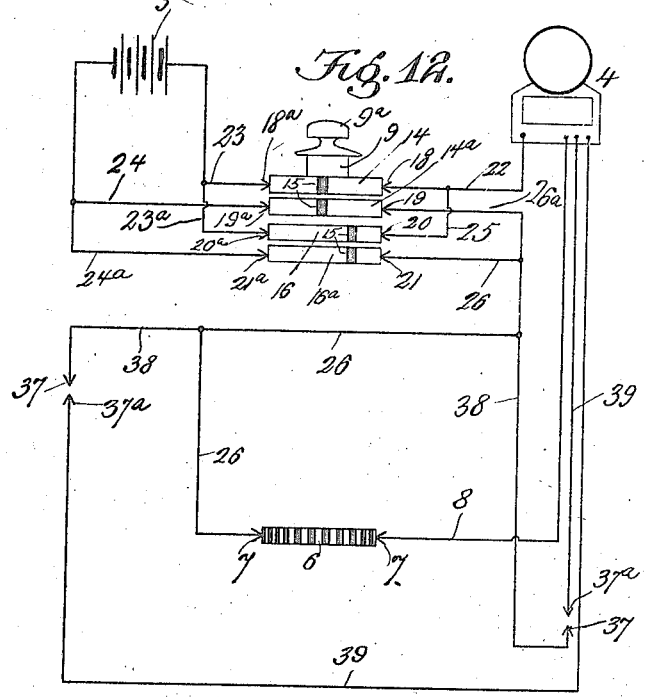

In the drawings, Figure 1 is an elevation of a fragment of a motor vehicle showing the application of the invention; Fig. 2 is an elevation of the alarm mechanism, a portion of the housing thereof being shown removed; Fig. 3 is an elevation of said removed portion of the housing; Fig. 4 is a horizontal section on the line 4—4 of Fig. 2, with a portion of the housing broken away; Figs. 5 and 6 are sections on the lines 5—5 and 6—6, respectively of Fig. 2; Fig. 7 is a section on the line 7—7 of Fig. 4; Fig. 8 is a vertical section of the mechanism shown in Fig. 7; Fig. 9 is a section on the line 9—9 of Fig. 7; Fig. 10 is a section on the line 10—10 of Fig. 8; Fig. 11 is a section on the line 11—11 of Fig. 4, and Fig. 12 is a diagram showing the electric circuits.

Referring specifically to the drawings, 1 denotes the steering shaft of an automobile or other motor vehicle, said shaft being provided with a hand wheel 1ª as usual. A stationary tube 1ᵇ incloses the shaft. Adjacent to the hand wheel, the tube is cut away to leave a portion of the shaft exposed and permit the attachment of parts which constitute the invention. These parts are inclosed in a housing of cylindrical form and composed of two separably connected sections 2 and 2ª, respectively, fastened together in a manner to be presently described. The housing has closed ends 2ᵇ and 2ᶜ, respectively, and it is secured in the gap formed by cutting away a portion of the tube 1ᵇ as stated, the ends of the tube being threaded, as shown at 3, to screw into the end walls 2ᵇ and 2ᶜ of the housing. The bared portion of the steering shaft thus passes lengthwise and centrally through the housing.

In the housing hereinbefore described is mounted an electro-responsive alarm device, which may be a bell 4, the current source being a battery 5. It is the object of the invention to cause the bell to be sounded if an unauthorized person attempts to run the car, and as it is impossible to run the car with the steering shaft 1 held stationary, this fact is taken advantage of in controlling the circuit of the bell. I therefore mount on the steering shaft, inside the housing, a circuit closer in the form of a ring 6 of conducting material having in its periphery, at regular intervals, recesses in which are mounted pieces 6ª of insulating material. At diametrically opposite points, the periphery of the ring is engaged by contact brushes 7 carried by suitable resilient supports 7ª mounted on the lower end wall 2ᶜ of the housing. One of these brushes is connected by a conductor 8 to one side of the bell 4, and the other brush is wired to one side of the battery or other current source 5. The other side of the bell is wired to the other side of the current source. When the brushes are in contact with the exposed portions of the periphery of the ring, the bell circuit is closed and the bell is sounded. The exposed portions of the ring periphery are close together so that the slightest turn of the steering shaft causes the bell to be sounded. Certain other controlling devices to be presently described are also interposed in the alarm circuit. In order that the alarm circuit may be kept open when the car is properly in use, the following mechanism is provided:

In the top end wall 2$^b$ of the housing is an opening in which is rotatably mounted a spindle 9 having on the outside of said wall a knob 9$^a$, and inside the housing the spindle is fitted with two cylindrical blocks 10 and 10$^a$, respectively, of insulating material. The block 10 is fixed on the spindle by a screw 11 and it turns with the spindle. In one end of the block 10$^a$ is an arcuate groove 12 and the adjacent end of the block 10 has a projecting pin 12$^a$ seating in said groove. Thus the block 10 may be turned without communicating this motion to the block 10$^a$ until the pin 12$^a$ reaches the end of the groove 12, whereupon the block 10$^a$ starts to turn with the block 10 and in the same direction.

At the inner end of the spindle 9 is a retaining cap 13 for the block 10$^a$, said cap being secured to the spindle by a screw bolt 13$^a$.

The block 10 carries two parallel conductor rings 14 and 14$^a$, respectively, which are not continuous but have each a gap 15 filled with the material of the block. The block 10$^a$ carries two similar conductor rings 16 and 16$^a$, respectively, also provided each with a gap 15.

On diametrically opposite sides of the parts carried by the spindle 9 are mounted contact brushes, a pair of brushes being provided for each one of the conductor rings. The groups of contacts on each side of the rings are carried by resilient supports 17 secured to and depending from the wall 2$^b$. The contacts are also insulated from each other as shown in Fig. 7. The contacts coöperating with the conductor ring 14 are denoted by the reference characters 18 and 18$^a$, those of the ring 14$^a$ by the reference characters 19 and 19$^a$, those of the ring 16 by the reference characters 20 and 20$^a$, and those of the ring 16$^a$ by the reference characters 21 and 21a.

The contact 18 is connected to one side of the bell by a conductor 22. The contact 18$^a$ is connected to one side of the current source 5 by a conductor 23, and from this conductor a branch 23$^a$ is connected to the contact 20$^a$. The other side of the current source is connected by a conductor 24 to the contact 19$^a$ and by a branch conductor 24$^a$ to the contact 21$^a$. A branch 25 connects the conductor 22 with the contact 20. A conductor 26 is connected to the contact 21 and leads to one of the contacts 7, the other contact 7 being connected by a conductor 8 to the bell 4 as hereinbefore described. A branch 26$^a$ leads from the conductor 26 to the contact 19.

It will be seen from the foregoing that the rings 14, 14$^a$, 16 and 16$^a$ provide a connection between the contacts 18 and 18$^a$, 19 and 19$^a$, 20 and 20$^a$, 21 and 21$^a$, except when the insulation gaps 15 engage either one of the two groups of contacts, whereupon the alarm circuit is broken. This will be the position of the rings during the ordinary running of the car, and when the owner leaves the car, he turns the spindle 9 to take the insulation gaps off the contacts, thereby establishing the current connections between the contacts. If now an attempt is made to turn the steering shaft 1, the bell 4 is sounded by establishing a circuit connection across the contacts 7 as hereinbefore described.

The knob 9$^a$ has an index mark coöperating with a scale 27, the arrangement being similar to the knob of a permutation lock. There is an established relation between the index mark and the position of the blocks 10 and 10$^a$ on the spindle 9. To set the blocks so that the alarm circuit is broken, the spindle is turned in one direction the required predetermined distance from the zero position to bring the gaps 15 of the rings 16 and 16$^a$ opposite the contacts 20 and 21 or 20$^a$ and 21$^a$. The motion of the spindle is transmitted from the block 10 through the pin 12$^a$ to the block 10$^a$. The spindle is next turned back the required predetermined distance to bring the gaps 15 of the rings 14 and 14$^a$ opposite the contacts 18 and 19 or 18$^a$ and 19$^a$. There is now a gap in the alarm circuit, and the alarm will not be sounded when the steering shaft 1 is operated. To place the mechanism in position to cause the alarm to be sounded when the steering shaft is operated, it is necessary only to turn the knob 9$^a$ to establish the connection between the contacts 18 and 18$^a$, 19 and 19$^a$, 20 and 20$^a$, and 21 and 21$^a$, through the conductor rings 14 and 14$^a$, 16 and 16$^a$.

In order that the alarm may also be sounded if an attempt is made to break the housing open, there is provided a circuit closing mechanism consisting of the following parts:

The section 2$^a$ of the housing seats in an opening in the side of the section 2. In the edges of this opening are recesses 29 in which seat projecting parts 30 on the section 2$^a$, so that overlapping parts are had at the joint between the sections. Through these overlapping parts pass long bolts 31 the parts 30 having longitudinal holes for said bolts, and the latter entering the side wall at one end terminating a short distance from the opposite end of the section 2 where the bolts enter recesses 32 in the latter. The inner ends of the bolts do not extend to the inner ends of the recesses, and they are in contact with plungers 33 slidably mounted in the recesses and held pressed against the inner ends of the bolts by springs 34. In that part of the housing carrying the plungers 33, on the inside of the housing, are longitudinal slots 35 through which pass stems 36 extending from the plungers 33, and carrying contacts 37. Opposite each contact 37, the housing section 2, on the inside thereof, carries an insulated contact 37ª. One of the bolts passes downward from the top of the housing, and the other bolt passes upward from the bottom of the housing.

The contacts 37 are connected by conductors 38 to the conductor 26, and the contacts 37ª are connected by conductors 39 to one side of the bell 4.

The contacts 37 and 37ª are normally spaced, but when an attempt is made to remove the bolts 31, the plungers 33 follow the bolts, they being advanced by the springs 34, and when the contact 37 engages the contact 37ª the bell 4 is sounded, provided of course the permutation circuit closer hereinbefore described has been set.

In order to provide a tight, waterproof joint between the sections 2 and 2ª of the housing, the meeting edges thereof are connected by a tongue-and-groove joint as shown in Fig. 4.

I claim:

1. The combination with the steering shaft of a motor vehicle; of an electro-responsive alarm device, a pair of contacts interposed in the circuit of said device, a circuit closing member mounted on the steering shaft to turn therewith, and engageable by the contacts, a lock-controlled switch in the aforesaid circuit, a sectional housing inclosing the alarm device and the aforementioned parts associated therewith, bolts fastening the housing sections together, slidable members seating against the inner ends of the bolts and movable with the bolts when the latter are withdrawn, contacts carried by said members, and contacts opposite said contacts, said last mentioned pairs of contacts being also interposed in the circuit of the alarm device.

2. The combination with the steering shaft of a motor vehicle; of an electro-responsive alarm device, a conductor ring having gaps of insulating material on its periphery and mounted on the steering wheel to turn therewith, contacts engaging the periphery of the ring and interposed in the circuit of the alarm device, a lock-controlled switch in said circuit, a sectional housing inclosing the alarm device and the aforementioned parts associated therewith, bolts fastening the housing sections together, slidable members seating against the inner ends of the bolts and movable with the bolts when the latter are withdrawn, contacts carried by said members, and contacts opposite said contacts, said last-mentioned pairs of contacts being also interposed in the circuit of the alarm device.

3. The combination with the steering shaft of a motor vehicle; of an electro-responsive alarm device, a conductor ring having a periphery of closely spaced contact points and mounted on the steering wheel to turn therewith, contacts engaging the periphery of the ring and interposed in the circuit of the alarm device, a lock-controlled switch in said circuit, a sectional housing inclosing the alarm device and the aforementioned parts associated therewith, bolts fastening the housing sections together, slidable members seating against the inner ends of the bolts and movable with the bolts when the latter are withdrawn, contacts carried by said members, and contacts opposite said contacts, said last-mentioned pairs of contacts being also interposed in the circuit of the alarm device.

4. The combination with an electro-responsive alarm device, and means for controlling the same; of a sectional housing inclosing the alarm device and the aforementioned parts associated therewith, bolts fastening the housing sections together, slidable members seating against the inner ends of the bolts and movable with the bolts when the latter are withdrawn, contacts carried by said members, and contacts opposite said contacts, said last-mentioned pairs of contacts being also interposed in the circuit of the alarm device.

In testimony whereof I affix my signature.

BENJAMIN F. JOHNSTON.